No Printed Specification Available
6517X
A. Richardson,
Splitting Leather,
Patented Apr. 23, 1831.
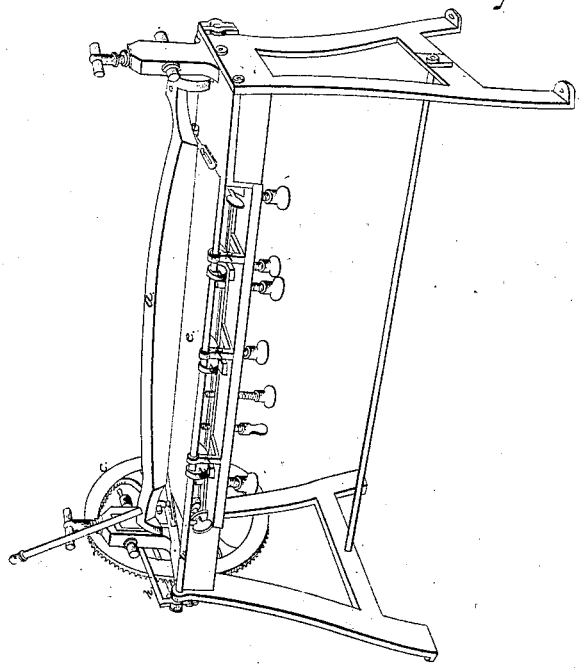
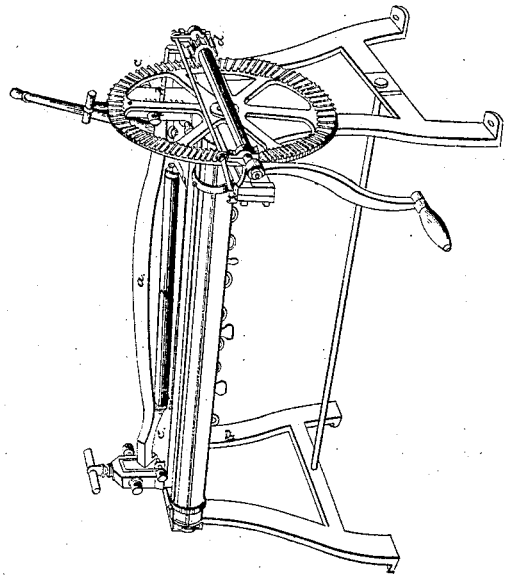
N. PETERS, PHOTO-LITHOGRAPHER, WASHINGTON, D C.

MISSING PAGE TEMPORARY NOTICE

PATENT # 6517X FOR ISSUE DATE 4-23-1831

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

Del Left